United States Patent [19]

Eichenauer et al.

[11] Patent Number: 5,420,181
[45] Date of Patent: May 30, 1995

[54] COMPOSITION OF POLYCARBONATE, ABS, A BASIC ADDITIVE AND A CARBOXYLIC AND COMPOUND

[75] Inventors: Herbert Eichenauer, Dormagen; Karl-Heinz Ott, Leverkusen; Alfred Pischtschan, Kürten-Eichhoff; Edgar Leitz, Dormagen; Karl-Erwin Piejko, Bergisch-Gladbach, all of Germany

[73] Assignee: Bayer Aktiengesellschaft, Leverkusen, Germany

[21] Appl. No.: 320,115

[22] Filed: Oct. 7, 1994

Related U.S. Application Data

[63] Continuation of Ser. No. 79,880, Jun. 23, 1993, abandoned.

[30] Foreign Application Priority Data

Jul. 3, 1992 [DE] Germany .................. 42 21 935 3

[51] Int. Cl.⁶ ............... C08L 69/00; C08L 55/02; C08K 5/092
[52] U.S. Cl. .................. 524/91; 524/100; 524/102; 524/228; 524/243; 524/295; 524/296; 524/303; 524/304; 524/305; 524/320; 524/321; 524/504; 524/508; 525/67
[58] Field of Search .......... 524/91, 100, 102, 228, 524/243, 295, 296, 303, 304, 305, 320, 321, 504, 508; 525/67

[56] References Cited

U.S. PATENT DOCUMENTS

| | | | |
|---|---|---|---|
| 3,130,177 | 4/1964 | Grabowski | 525/67 |
| 4,299,929 | 11/1981 | Sakano | 524/321 |
| 4,740,553 | 4/1988 | Maeda | 525/67 |
| 4,983,648 | 1/1991 | Laughner | 524/504 |
| 5,128,409 | 7/1992 | Gaggar | 525/67 |

FOREIGN PATENT DOCUMENTS

0520074 12/1992 European Pat. Off. .
0549205 6/1993 European Pat. Off. .

OTHER PUBLICATIONS

Chemical Abstract 116(26):256891j; 1991.
Grant & Hackh's Chemical Dictionary pp. 1–3, 1990.

*Primary Examiner*—David Buttner
*Attorney, Agent, or Firm*—Connolly and Hutz

[57] ABSTRACT

Thermoplastic molding compositions containing
A) ABS-type resin,
B) aromatic polycarbonate resins,
C) a compound bearing several carboxyl groups or mixtures thereof and optionally
D) further polymer resins, characterized in that an ABS resin with at least one basically acting additive is used as component A, component C is selected from compounds having a molecular weight of from 150 to 260 having at least two carboxyl groups (—COOH) in the molecule, and the weight ratio of basically acting additive in A: carboxyl groups in C is from 5:1 to 1:1.

13 Claims, No Drawings

COMPOSITION OF POLYCARBONATE, ABS, A BASIC ADDITIVE AND A CARBOXYLIC AND COMPOUND

This application is a continuation of application Ser. No. 08/079,880 filed on Jun. 23, 1993, now abandoned.

The invention relates to thermoplastic moulding compositions prepared from ABS polymers and aromatic polycarbonates, a process for their production and their use for the production of mouldings.

Mixtures of ABS and polycarbonate and their use as moulding compounds are known. They generally contain ABS resin, which is composed of, for example, a copolymer of styrene and acrylonitrile and a graft copolymer of styrene and acrylonitrile onto a diene rubber, such as for example polybutadiene, and, for example, polycarbonate based on bisphenol A. These moulding compounds are characterised by good strength both at room temperature and at low temperatures, good processability and elevated heat resistance.

A disadvantage of such moulding compounds is that, in order to avoid deleterious effects on the polycarbonate and therefore an accompanying deterioration of properties, ABS polymers which are free of basically acting constituents must always be used in their production.

Previously, due to this requirement, a specially produced or worked up ABS polymer which is free of basic constituents, always had to be prepared for use in ABS/polycarbonate mixtures. ABS polymers, which are not intended from the outset for blending with polycarbonates, often have basic additives incorporated (for example as lubricants or mould release agents). This also applies to ABS polymers which are blended with polymers other than polycarbonate. Such ABS polymers or ABS polymers which are obtained from recycling moulding compounds containing basic additives, cannot therefore be used for the production of ABS/polycarbonate mixtures.

It has now been found that by using special polymer resins bearing carboxyl groups as blend components, mixtures of aromatic polycarbonate resins and ABS resins containing basically acting additives may be produced, which mixtures give mouldings with good properties; nor is there any damage caused to the polycarbonate component by the acid compounds.

Moreover, even relatively small quantities of the special compounds which are added are so effective that no negative influences such as for example increased volatility or marked increases in melt flow rate occur.

The present invention provides thermoplastic moulding compounds containing
A) ABS type resin,
B) aromatic polycarbonate resins,
C) a compound bearing a plurality of carboxyl groups or mixtures thereof and optionally
D) further polymer resins,
characterised in that an ABS resin having at least one basically acting additive is used as component A, component C is selected from among compounds having a molecular weight of from 150 to 260, preferably from 160 to 230, and particularly preferably from 180 to 220, which exhibit at least two carboxyl groups (—COOH) in the molecule, and the weight ratio of basically acting additive in A): carboxyl groups in C) is from 5:1 to 1:1, preferably from 4:1 to 1:1.

The thermoplastic moulding compounds preferably contain from 50 to 100 parts by weight, particularly preferably from 60 to 90 parts by weight, in particular from 70 to 80 parts by weight, of component A, preferably from 1 to 50 parts by weight, particularly preferably from 5 to 50 parts by weight, in particular from 10 to 45 parts by weight, of component B and preferably from 0.2 to 5 parts by weight, particularly preferably from 0.25 to 4 parts by weight, in particular from 0.3 to 3 parts by weight, of component C.

Resins of the ABS type (component A) contain pursuant to the present invention 5 to 100 wt. %, preferably 5 to 80 wt. %, of a graft polymer and 95 to 0% wt. %, preferably 95 to 20 wt. %, of a thermoplastic copolymer resin.

Graft polymers are those polymers in which styrene or methyl methacrylate or a mixture of 95 to 50 wt. % of styrene, α-methylstyrene, ring-substituted styrene, methyl methacrylate or mixtures thereof and 5 to 50 wt. % of acrylonitrile, methacrylonitrile, maleic anhydride, N-substituted maleimides or mixtures thereof are graft polymerised onto a rubber. Suitable rubbers are practically all rubbers with glass transition temperatures $\leq 10°$ C., for example polybutadiene, styrene/butadiene copolymers, acrylonitrile/butadiene copolymers, polyisoprene, alkyl acrylate rubbers, preferably $C_1-C_8$ alkyl acrylate rubbers, such as for example poly-n-butyl acrylate.

The alkyl acrylate rubbers may optionally contain up to 30 wt. % (related to the weight of the rubber) of copolymerised monomers such as vinyl acetate, acrylonitrile, styrene, methyl methacrylate and/or vinyl ethers. The alkyl acrylate rubbers may also contain smaller quantities, preferably up to 5 wt. % (related to the weight of the rubber) of ethylenically unsaturated monomers with crosslinking action. Such crosslinking agents are, for example, alkenediol diacrylates and dimethacrylates, polyester diacrylates and dimethacrylates, divinyl benzene, trivinyl benzene, triallyl cyanurate, allyl acrylate and methacrylate, butadiene or isoprene.

The grafting base may also be acrylate rubbers with a core/skin structure with a core of crosslinked diene rubber prepared from one or more conjugated dienes, such as polybutadiene, or a copolymer of a conjugated diene with an ethylenically unsaturated monomer such as styrene and/or acrylonitrile.

Further suitable rubbers are, for example, the so-called EPDM rubbers (polymers of ethylene, propylene and an unconjugated diene such as, for example, dicyclopentadiene), EPM rubbers (ethylene/propylene rubbers) and silicone rubbers, which may also optionally have a core/shell structure. Polybutadiene and alkyl acrylate rubbers are preferred.

The graft polymers contain 10 to 95 wt % in particular 20 to 70 wt. % of rubber and 90 to 5 wt. %, in particular 80 to 30 wt. %, of graft copolymerised monomers. The rubbers are present in these graft copolymers in the form of at least partially crosslinked particles with an average particle diameter ($d_{50}$) of in general 0.05 to 20.0 μm, preferably 0.1 to 2.0 μm and particularly preferably 0.1 to 0.8 μm.

Such graft copolymers may be produced by free-radical graft copolymerisation of monomers from the range styrene, α-methylstyrene, ring-substituted styrene, (meth)acrylonitrile, methyl methacrylate, maleic anhydride, N-Substituted maleimide in the presence of the rubbers to be grafted. Preferred production process for such graft copolymers are emulsion, solution, bulk or suspension polymerisation.

The thermoplastic copolymers may be built up from the graft monomers or similar monomers, in particular from at least one monomer from the range styrene, α-methylstyrene, halogen styrene, acrylonitrile, methacrylonitrile, methyl methacrylate, maleic anhydride, vinyl acetate and N-substituted maleimide. These thermoplastic copolymers are preferably copolymers of 95 to 50 wt. % of styrene, α-methylstyrene, methyl methacrylate or mixtures thereof with 5 to 50 wt. % of acrylonitrile, methacrylonitrile, methyl methacrylate, maleic anhydride or mixtures thereof.

Such copolymers also occur as by-products during graft copolymerisation. It is customary to incorporate separately produced copolymers as well as the copolymers contained in the graft polymer. These separately produced copolymers are not necessarily chemically identical to the ungrafted resin constituents present in the graft polymers.

Suitable separately produced copolymers are resinous, thermoplastic and contain no rubber; they are in particular copolymers of styrene and/or α-methylstyrene with acrylonitrile, optionally mixed with methyl methacrylate.

Particularly preferred copolymers consist of 20 to 40 wt. % of acrylonitrile and 80 to 60 wt. % of styrene or α-methylstyrene. Such copolymers are known and may, in particular, be produced by free-radical polymerisation, in particular by emulsion, suspension, solution or bulk polymerisation. The copolymers generally have average molecular weights ($\overline{M}_w$) of 15,000 to 200,000, preferably 50,000 to 150,000.

The ABS resins may be used individually or blended.

According to the invention, particularly suitable ABS resins (component A) with at least one basically acting additive are those products which have already been processed into mouldings as pure ABS resins and have already passed through at least one cycle of use as such mouldings, i.e. ABS resins which have been obtained by recovery (recycling) from already used mouldings can be reused in this manner.

As a rule, the basically acting additives contained in the ABS resin component which are involved are those compounds which were added to the ABS resin to improve its properties (for example, inter alia, as lubricant, mould release agent, antistatic agent, stabiliser, light stabiliser). The proportion of basically acting additive, related to the ABS resin, is generally from about 0.01 to 5 wt-%, it being possible for the proportion to vary in an upward or downward direction. The proportion of basically acting additive is preferably from about 0.05 to 3 wt-%, related to ABS.

Examples of such compounds are carboxylic acid (di)amides, for example stearic acid amide or ethylenediamine bis-stearyl amide, metal salts of long-chain carboxylic acids, for example calcium stearate, ethoxylated fatty amines, fatty acid ethanolamides, sterically hindered phenols, for example 2,4-bis(n-octylthio)-6-(4-hydroxy-3,5-tert.-butylanilino)-1,3,5-triazine, sterically hindered amines, for example sebacic acid bis-2,2,4,4-tetramethyl-4-piperidyl ester, benzotriazole derivatives, for example 2-(2'-hydroxy-5'-methylphenyl)-benzotriazole.

Aromatic polycarbonate resins (component B) pursuant to the present invention may be both homopolycarbonates and copolycarbonates prepared from diphenols of the formulae (I) and (II)

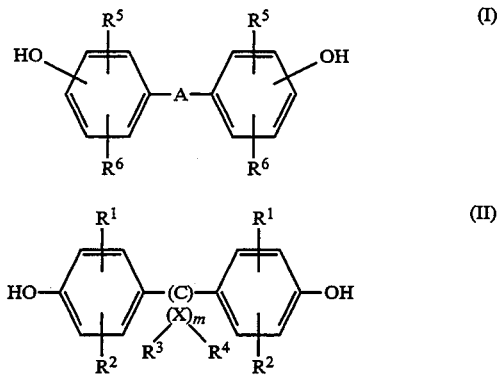

in which
A is a single bond, $C_1$–$C_5$ alkene, $C_2$–$C_5$ alkylidene, $C_5$–$C_6$ cycloalkylidene, —O—, —S—, or —SO$_2$—,
$R^5$ and $R^6$ mutually independently stand for hydrogen, methyl or halogen, in particular for hydrogen, methyl, chlorine or bromine,
$R^1$ and $R^2$ mutually independently mean hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$-alkyl, in particular benzyl,
m is an integer from 4 to 7, preferably 4 or 5,
$R^3$ and $R^4$ are individually selectable for each X and mutually independently mean hydrogen or $C_1$–$C_6$ alkyl, preferably methyl or ethyl and
X means carbon.

The polycarbonates according to component B may be both linear and branched, they may contain aromatically bonded halogen, preferably bromine and/or chlorine, they may also, however, be free of aromatically bonded halogen, thus free of halogen.

The polycarbonates B may be used both individually and blended.

The diphenols of the formulae (I) and (II) are either known in the literature or may be produced according to processes known in the literature (see for example EP-A-0 359 953).

Production of the suitable polycarbonates according to the invention according to component B is known in the literature and may, for example, proceed with phosgene in accordance with the phase interface process or with phosgene in accordance with the homogeneous phase process (the so-called pyridine process), wherein the particular molecular weight to be achieved is adjusted in a known manner with an appropriate quantity of known chain terminators.

Suitable chain terminators are, for example, phenol or p-tert.-butylphenol, but also long-chain alkyl phenols such as 4-(1,3-tetramethyl-butyl)phenol according to DE-OS 2 842 005 or monoalkyl phenols or dialkyl phenols with a total of 8 to 20 C atoms in the alkyl substituents according to DE-OS 3 506 472, such as, for example, p-nonylphenol, 2,5-di-tert.-butylphenol, p-tert.-octylphenol, p-dodecylphenol, 2-(3,5-dimethylheptyl)-phenol and 4-(3,5-dimethylheptyl)phenol. The quantity of chain terminators to be used is generally between 0.5 and 10 mol %, related to the total of the particular diphenols (I) and (II) used.

The suitable polycarbonates according to the invention according to component B may be branched in a known manner, namely, by way of example, by the incorporation of 0.05 to 2.0 mol % related to the total of the diphenols used, of trifunctional or greater than trifunctional compounds, for example such compounds with three or more than three phenolic OH groups.

These compounds have average weight average molecular weights ($\overline{M}_w$, measured, for example, by ultracentrifuging or light-scattering measurement) of 10,000 to 200,000, preferably from 20,000 to 80,000.

Suitable diphenols of the formulae (I) and (II) are, for example, hydroquinone, resorcinol, 4,4'-dihydroxydiphenyl, 2,2-bis (4-hydroxyphenyl)propane, 2,4-bis (4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, 1,1-bis(4-hydroxyphenyl)-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols of the formula (I) are 2,2-bis(4-hydroxyphenyl)propane and 1,1-bis(4-hydroxyphenyl)cyclohexane.

The preferred phenol of the formula (II) is 1,1-bis(4-hydroxyphenyl)-3,3,5-trimethylcyclohexane. Mixtures of diphenols may also be used.

According to the invention, particularly suitable polycarbonate resins (component B) are those products which (optionally mixed with ABS resins containing no basically acting additives) have already been processed into mouldings and have already passed through one cycle of use as such mouldings, i.e. polycarbonate resins which were obtained by recovery (recycling) from already used mouldings can be reused in this manner for the production of new mouldings.

Suitable compounds having a plurality of carboxyl groups (component C) are preferably compounds of the formulae (I), (II) and (III) and hydroxypolycarboxylic acids and alkyl-substituted polycarboxylic acids.

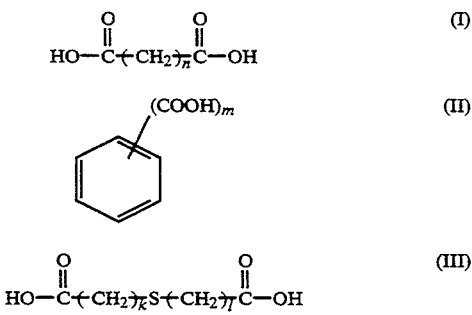

wherein
n=5 to 12
m=2 to 4
k, l=1, 2 or 3, independently of one another.

Examples of compounds of the formula (I) are pimelic acid, suberic acid, azelaic acid, sebacic acid, 1,10-decanedicarboxylic acid, 1,12-dodecanedicarboxylic acid;

Examples of compounds of the formula (II) are phthalic acid, isophthalic acid, terephthalic acid, trimelitic acid (1,2,4-benzenetricarboxylic acid), trimesic acid (1,3,5-benzenetricarboxylic acid) and pyromellitic acid (1,2,4,5-benzenetetracarboxylic acid);

Examples of compounds of the formula (III) are 2,2'-thiodiacetic acid and 3,3'-thiodipropionic acid;

Examples of hydroxypolycarboxylic acids are mucic acid, citric acid; examples of alkyl-substituted polycarboxylic acids are diethylmalonic acid, 3,3-dimethylglutaric acid.

Preferred compounds according to component C are azelaic acid, sebacic acid, phthalic acid, terephthalic acid, 2,2'-thiodiacetic acid, mucic acid, citric acid and diethylmalonic acid.

Optionally, the thermoplastic moulding compounds according to the invention may contain small proportions of further polymer resins, preferably below 20 wt. %, particularly preferably below 10 wt. %. Examples of further polymer resins are aromatic polyesters, for example polyethylene terephthalate or polybutylene terephthalate, thermoplastic polyurethanes, polyacrylates, for example copolymers of (meth)acrylate monomers with acrylonitrile or polyacetals, for example polyoxymethylene, together with polyamides such as, for example, polyamide-6 or polyamide-66.

Furthermore, other, preferably not basically acting, additives known for ABS resins and polycarbonate resins, such as for example stabilisers, pigments, mould release agents, flame retardants, lubricants and antistatic agents may be incorporated in customary quantities into the moulding compounds according to the invention.

Mixing of the polymer; components to produce the thermoplastic moulding compounds according to the invention proceeds in customary mixing units, thus, for example, in kneaders, internal mixers, in roll mills, screw compounders or extruders, preferably above 200° C. The constituents may be blended consecutively or simultaneously, preferably, components (A) and (C) are initially mixed and then the resultant blend is mixed with component (B) and optionally component (D).

The invention also therefore provides a process for the production of the moulding compounds according to the invention by blending the constituents at elevated temperature.

The moulding compounds according to the invention may be used for the production of any kind of mouldings, for example those produced by injection moulding or extrusion. Examples of such mouldings are casing parts, covering plates or automotive parts. Mouldings may also be produced by thermoforming previously produced sheets or films. The invention also therefore provides the use of the described moulding compounds for the production of mouldings.

EXAMPLES

| Polymers used: | |
|---|---|
| A.1) ABS resin containing | |
| 15 parts by weight | of a graft rubber prepared from 50 wt. % of a polybutadiene base with an average particle diameter (d$_{50}$) of 0.1 μm, onto which were grafted 36 wt. % of styrene and 14 wt. % of acrylonitrile, |
| 15 parts by weight | of a graft rubber prepared from 50 wt. % of a polybutadiene base with an average particle diameter (d$_{50}$) of 0.4 μm, onto which were grafted 36 wt. % of styrene and 14 wt. % of acrylonitrile, |
| 70 parts by weight | of a styrene/acrylonitrile 72:28 copolymer with an M$_w$ of |

-continued

Polymers used:

|   |   |
|---|---|
|   | approx. 80,000 with $M_w/M_n$ of $-1 \leq 2$ and |
| 2 parts by weight | of ethylenediamine bis-stearyl amide, |
| produced by mixing the components in an internal kneader. | |

A.2) ABS resin containing

|   |   |
|---|---|
| 60 parts by weight | of a graft rubber prepared from 50 wt. % of a polybutadiene base with an average particle diameter ($d_{50}$) of 0.4 μm, onto which were grafted 36 wt. % of styrene and 14 wt. % of acrylonitrile, |
| 40 parts by weight | of a styrene/acrylonitrile 72:28 copolymer with an $M_w$ of approx. 80,000 with $M_w/M_n$ of $-1 \leq 2$ and |
| 1 part by weight | of a mixture of ethoxylated fatty amines, |
| produced by mixing the components in an internal kneader. | |

A.3) ABS resin containing

|   |   |
|---|---|
| 15 parts by weight | of a graft rubber prepared from 50 wt. % of a polybutadiene base with an average particle diameter ($d_{50}$) of 0.1 μm, onto which were grafted 36 wt. % of styrene and 14 wt. % of acrylonitrile, |
| 15 parts by weight | of a graft rubber prepared from 50 wt. % of a polybutadiene base with an average particle diameter ($d_{50}$) of 0.4 μm, onto which were grafted 36 wt. % of styrene and 14 wt. % of acrylonitrile, |
| 40 parts by weight | of an α-methylstyrene/acrylonitrile 72:28 copolymer with an $M_w$ of approx. 65,000 with $M_w/M_n$ of $-1 \leq 2$ and |
| 30 parts by weight | of a styrene/acrylonitrile 72:28 copolymer with an $M_w$ of approx. 80,000 with $M_w/M_n$ of $-1 \leq 2$ and |
| 1 part by weight | of magnesium stearate, | produced by mixing the components in an internal kneader.

B.1) Aromatic polycarbonate prepared from 2,2-bis(4-hydroxyphenyl)propane (bisphenol A) with a relative viscosity of 1.26 (measured in $CH_2Cl_2$ at 25° C. as a 0.5 wt. % solution), corresponding to an $M_w$ of approx. 25,000.

C.1) Azelaic acid (MW: 188)
C.2) Phthalic acid (MW: 166)
C.3) Pyromellitic acid (MW: 254)
C.4) 2,2'-thiodiacetic acid (MW: 150)
C.5) Citric acid (MW: 192)
C.6) Mucic acid (MW: 210)

PRODUCTION AND TESTING OF THE MOULDING COMPOUNDS

Moulding compounds were produced by mixing the parts by weight stated in table 1 of the above-described components in an internal kneader at approx. 200° C., which compounds were then injection moulded into test-pieces at 250° C. The following parameters were measured, notched impact strength at room temperature ($a_k^{RT}$) and at $-40°$ C. ($a_k^{-4° C.}$) to ISO 180 A (unit kJ/m²), impact strength at $-40°$ C. ($a_n^{-4° C.}$) to ISO 180 C (unit kJ/m²), ball indentation hardness ($H_c$) to DIN 53 456 (unit N/mm²), softening temperature (Vicat B) to DIN 53 460 (unit °C.).

Surface gloss was determined on a flat sheet in accordance with DIN 67 530 at a reflection angle of 60° (reflectometer value) with the assistance of the "Multi-Gloss" multi-angle reflectometer from the company Byk-Mallinckrodt (see table).

As may be seen from the examples, in comparison with the moulding compounds without component C, the moulding compounds according to the invention exhibit distinctly better properties, in particular a combination of high strength (even at low temperature) and good surface finish with equally good heat resistance (Vicat B) and ball indentation hardness ($H_c$).

TABLE 1

| Molding compound | Composition of moulding compounds | | | | | | | | | | Wt. ratio‡ |
|---|---|---|---|---|---|---|---|---|---|---|---|
| | A.1 | A.2 | A.3 | B.1 | C.1 | C.2 | C.3 | C.4 | C.5 | C.6 | |
| 1 | 50 | 27.5 | — | 22.5 | 1 | — | — | — | — | — | 2.66 |
| 2 | 50 | 27.5 | — | 22.5 | — | 1 | — | — | — | — | 2.35 |
| 3 | 50 | 27.5 | — | 22.5 | — | — | 1 | — | — | — | 1.80 |
| 4 | 50 | 27.5 | — | 22.5 | — | — | — | 1 | — | — | 2.13 |
| 5 | 50 | 27.5 | — | 22.5 | — | — | — | — | 1 | — | 1.81 |
| 6 | 50 | 27.5 | — | 22.5 | — | — | — | — | — | 1 | 2.97 |
| 7 (comparison) | 50 | 27.5 | — | 22.5 | — | — | — | — | — | — | — |
| 8 | — | 60 | — | 40 | — | 0.5 | — | — | — | — | 2.21 |
| 9 (comparison) | — | 60 | — | 25 | — | — | — | — | — | — | — |
| 10 | — | 37.5 | 37.5 | 25 | — | — | — | — | 0.5 | — | 2.13 |
| 11 | — | 37.5 | 37.5 | 25 | — | — | — | — | — | 0.5 | 3.50 |

† = parts by weight
‡ = weight ratio of (basic additive in A):(carboxyl groups in C)

TABLE 2

| Moulding compound | Test data for moulding compounds | | | | | |
|---|---|---|---|---|---|---|
| | $a_k^{RT}$ | $a_k^{-40° C.}$ | $a_n^{-40° C.}$ | $H_c$ | Vicat B | Reflectometer value |
| 1 | 12 | 6 | 48 | 98 | 100 | 80 |
| 2 | 14 | 6 | 55 | 99 | 101 | 79 |
| 3 | 10 | 4 | 45 | 100 | 101 | 74 |
| 4 | 12 | 6 | 46 | 100 | 99 | 81 |
| 5 | 12 | 5 | 50 | 100 | 100 | 78 |
| 6 | 13 | 5 | 52 | 99 | 100 | 77 |
| 7 (comparison) | 2 | 2 | 12 | 100 | 99 | 55 |

TABLE 2-continued

| Moulding compound | Test data for moulding compounds | | | | | Reflectometer value |
|---|---|---|---|---|---|---|
| | $a_{kRT}$ | $a_k{}^{-40°\,C.}$ | $a_n{}^{-40°\,C.}$ | $H_c$ | Vicat B | |
| 8 | 22 | 7 | 99 | 99 | 106 | 77 |
| 9 (comparison) | 3 | 2 | 14 | 100 | 108 | 52 |
| 10 | 16 | 5 | 58 | 97 | 102 | 73 |
| 11 | 16 | 6 | 55 | 99 | 103 | 76 |

We claim:

1. Thermoplastic molding composition consisting essentially of:
   A) a resin comprising a graft rubber and a thermoplastic copolymer resin;
   B) aromatic polycarbonate resin;
   C) a compound bearing a plurality of carboxyl groups of mixtures such compounds selected from the group consisting of trimellitic acid, trimesic acid, pyromellitic acid, alkyl substituted polycarboxylic acids, hydroxypolycarboxylic acids, and compounds of the formula

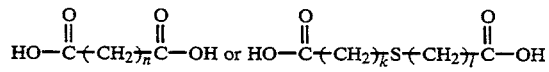

wherein
n=5 to 12
k, l=1, 2 or 3, independently of one another, and
wherein the resin A) contains at least one basically acting additive selected from the group consisting of carboxylic acid (di)amides, ethoxylated fatty acid amines, fatty acid ethanolamides, sterically-hindered phenols, sterically-hindered amines, and benzotriazole derivatives and the weight ratio of basically acting additive in A: carboxyl groups in C is from 5:1 to 1:1.

2. Thermoplastic moulding compositions according to claim 1 containing bisphenol A-polycarbonate as the aromatic polycarbonate resin.

3. Thermoplastic moulding compositions according to claim 1, which additionally contain stabilisers, pigments, mould release agents, flame retardants, lubricants and/or antistatic agents.

4. The thermoplastic molding composition of claim 1, wherein the weight ratio of basically-acting additive in A to carboxyl groups in C is from 4:1 to 1:1.

5. The thermoplastic molding composition of claim 1, wherein components A and B consist of previously-processed molding materials.

6. The thermoplastic molding composition of claim 1, wherein component A contains 5 to 80% by weight of graft polymer and 95 to 20% by weight of thermoplastic copolymer resin.

7. The thermoplastic molding composition of claim 1, wherein component A) contains a graft of styrene and acrylonitrile onto particulate polybutadiene or onto styrene/butadiene as graft rubber, and a copolymer of styrene or alpha-methyl styrene with acrylonitrile as thermoplastic copolymer resin.

8. Thermoplastic moulding compositions according to claim 1 which contain aromatic polyesters, thermoplastic polyurethanes, polyacrylates, polyacetals and/or polyamides.

9. The thermoplastic molding composition of claim 8, wherein components A. B and also the aromatic polyester, thermoplastic polyurethanes, polyacrylates, polyacetals, or polyamides consist of previously-processed molding materials.

10. In a process of preparing a thermoplastic molding composition which contains A) a resin comprising a graft rubber and a thermoplastic copolymer resin and B) polycarbonate, the improvement which comprises combining previously-processed resin A) which contains at least one basically acting additive selected from the group consisting of carboxylic acid (di)amides, ethoxylated fatty acid amines, fatty acid ethanolamides, sterically-hindered phenols, sterically-hindered amines, and benzotriazole derivatives with previously-processed aromatic polycarbonate resin in the presence of a compound containing at least two carboxyl groups and a molecular weight between 150 and 260, such that the weight ratio of basic additive in the previously-processed resin A) to carboxyl groups in the compound containing at least two carboxyl groups is from 5:1 to 1:1, optionally further together with an aromatic polyester, thermoplastic polyurethane, polyacrylate, polyacetal, or polyamide.

11. The process of claim 10, wherein 50 to 110 parts of the ABS type resin is combined with 1 to 50 parts by weight of the aromatic polycarbonate.

12. The process of claim 10, wherein the compound having at least two carboxyl groups is selected from the group consisting of trimellitic acid, trimesic acid, pyromellitic acid, alkyl substituted polycarboxylic acids, hydroxypolycarboxylic acids, and compounds of the formula

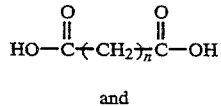

and

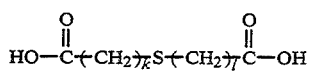

wherein
n=5 to 12
k, l=1, 2 or 3, independently of one another.

13. The process of claim 10 wherein the compound having at least two carboxyl groups is trimellitic acid, trimesic acid, or pyromellitic acid.

* * * * *